United States Patent [19]
Payne

[11] 4,339,017
[45] Jul. 13, 1982

[54] AIR CUSHION VEHICLE SKIRT MATERIAL AND METHOD

[76] Inventor: Carson R. Payne, 12 Yeomans Way, Markham, Ontario, Canada, L3P 3X2

[21] Appl. No.: 945,605

[22] Filed: Sep. 25, 1978

[51] Int. Cl.³ .............................................. B60V 1/16
[52] U.S. Cl. .................................. 180/127; 428/213; 428/247
[58] Field of Search ............... 180/127, 128, 124, 125, 180/126, 129, 130; 428/131, 255, 213, 246, 247

[56] References Cited

U.S. PATENT DOCUMENTS 3,481,424 12/1969 Barr ................................ 180/128 X
3,620,325 11/1971 Faure et al. ......................... 180/127
3,760,899 9/1973 Crossman ............................ 180/128

OTHER PUBLICATIONS

Sprayable Coating, an Advertising Brochure of Tip Top Rubber Products Ltd., Toronto, Canada.

Primary Examiner—John A. Pekar

[57] ABSTRACT

A flexible sheet material is disclosed for making air cushion vehicle skirts and the like. A molded seamless air cushion vehicle skirt and method of making same are also disclosed. In the method, an uncured, liquid polyurethane is sprayed onto a mold in the shape of a predetermined air cushion vehicle skirt. This forms a first continuous polyurethane layer on which is laid a foraminous substrate made of triaxially woven an aramid known by the trade mark of KEVLAR. The substrate is then coated with a second continuous layer of liquid, uncured polyurethane. The polyurethane layers penetrate the substrate and mix together so that when the polyurethane is cured, a continuous molded skirt is formed of material which cannot be delaminated. Parts of the mold may be masked to produce uncoated areas of the substrate. These areas may be later sprayed with liquid urethane to produce permeable sections in the air cushion vehicle skirt. The permeable sections reduce drag when the skirt is mounted on an air cushion vehicle and also prevent undesirable vibration or tramping problems in use.

16 Claims, 7 Drawing Figures

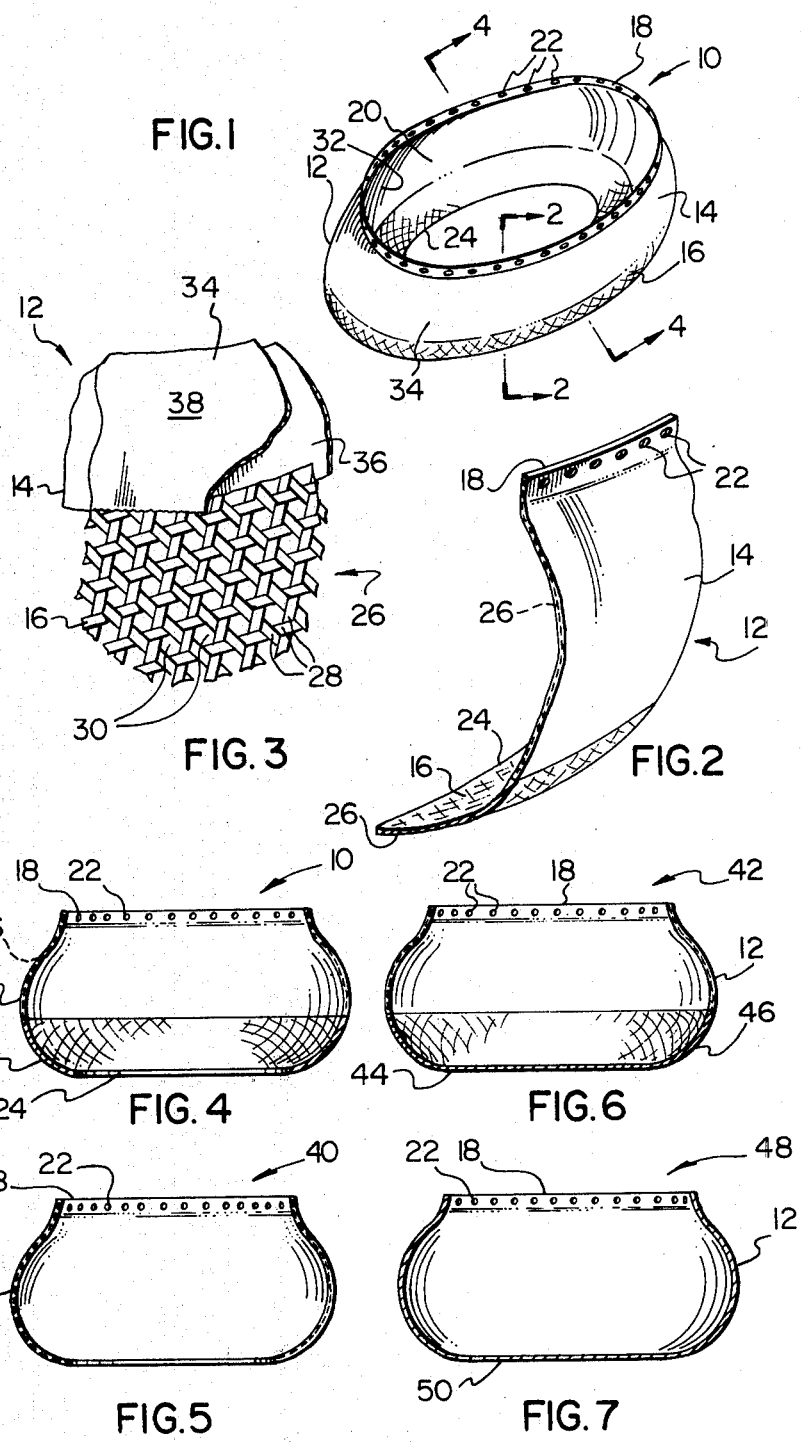

AIR CUSHION VEHICLE SKIRT MATERIAL AND METHOD

This invention relates to air cushion vehicle skirts and the like, and in particular, to a molded, seamless skirt and a material and method of making same.

There are many applications for air cushioning devices, and they generally all operate on the principle of providing a downwardly directed airflow against the earth's surface resulting in a lifting force. Probably the most common example of this type of device is the type of air cushion vehicle known by the trade mark of HOVERCRAFT. Other examples are aircraft landing pads or trunks and air-jacks. As the name implies, these devices provide an air cushion to support a load usually just above ground level, and a separate motive means is used to move the airs cushion vehicle over the ground. The term air cushion vehicle is intended in this disclosure to include all of these devices. However, this invention is concerned with the air cushioning aspect of these devices as opposed to the means for propulsion.

It is common in air cushion vehicles to provide a skirt around the base of the vehicle or device to enclose and form the air cushion and thus provide the lift for the vehicle. These skirts in the past have been made of various types of rubber, both natural and synthetic, and in order to obtain the strength required, rubber layers and reinforcing layers of different materials are often laminated together.

A difficulty with the air cushion vehicle skirts produced to date is that they are extremely prone to damage caused by delamination and being struck by foreign objects. The weakest characteristic of air cushion vehicle skirts in the past has been the weakness of the seams used in the construction of the skirts. It has been estimated that 80% of the maintenance costs of air cushion vehicles relates to the repair or replacement of the air cushion skirts. The prior art skirts frequently tear or delaminate or simply come apart at the seams.

In the present invention, molded, seamless air cushion vehicle skirts are produced which are extremely tear resistant and which are formed of integrally bonded material, thereby being highly resistant to delamination.

This invention provides a molded skirt for an air cushion vehicle or the like having a platform defining a support air outlet. The skirt comprises a continuous annular wall having an inwardly curved upper wall portion and inwardly curved lower wall portion, so that the annular wall is C-shaped in cross-section. The upper wall portion has an upper peripheral edge portion defining an air inlet. The upper wall portion includes means for attaching the skirt to a vehicle platform so that support air enters the air inlet. The lower wall portion has a lower peripheral edge portion adapted to be located above ground level by support air pressure inside the skirt. The annular wall includes a foraminous fabric substrate formed of a plurality of filaments, the substrate having first and second parallel side surfaces. The filaments on the first side surface have a first coating of polyurethane, and the filaments on the second side surface have a second coating of polyurethane. The first and second coatings extend into the foraminous substrate and are integrally bonded together to envelope the filament and define interstices in the coated substrate between the filaments.

OTHER FEATURES OF THE INVENTION

By one feature of the invention, the foraminous substrate extends over the full area of the annular wall.

By another feature of this invention, the foraminous substrate is formed of triaxially woven fabric having an open area between about 5 and about 50 percent of the total fabric area.

By yet another feature of the invention, the upper wall portion includes additional layers of the polyurethane on the first and second side surfaces, the additional layers being integrally bonded to the first and second coatings, the additional layers filling the interstices to form a continuous non-permeable polyurethane coating on the upper wall portion.

By still another feature of the invention, the polyurethane coatings are between about 0.002 inches and about 0.5 inches in thickness.

By a still further feature of the invention, the urethane is a sprayable polyether-based urethane to provide a polyurethane having a hardness of between about 20 durometer Shore A scale and about 100 durometer Shore D scale when cured.

By a still further feature of the invention, the foraminous substrate is a biaxial open weave fabric, and further comprising: a second bias ply of open weave fabric laid over the second polyurethane coating, and an additional layer of polyurethane on the bias ply.

By another feature of the invention, the molded skirt includes further layers of polyurethane bonded to the polyurethane on the first and second side surfaces.

By yet another feature of the invention, the molded skirt includes a generally flat floor continuously joined to the lower wall portion at the lower peripheral edge portion, the floor being an extension of the annular wall.

By still another feature of the invention, the means for attaching the skirt to a vehicle platform comprises means defining openings molded into the upper peripheral edge portion, the foraminous substrate filaments extending unbroken around the openings.

By a still further feature of the invention, the foraminous substrate is formed of fibers selected from the group consisting of an aramid, a polyester and a nylon.

By still a further feature of the invention, the molded skirt comprises further layers of polyurethane bonded to the additional layers, and wherein the additional and further polyurethane layers are color coded.

By yet a further feature of the invention, the foraminous substrate is formed of a high strength, high modulus aramid fiber and varies in weight between about 2.5 ounces per yard and about 30 ounces per yard.

By a still further feature of the invention, the foraminous substrate is formed of filaments precoated with polyurethane.

BRIEF DESCRIPTION OF THE DRAWINGS

A preferred embodiment of the invention will now be described by way of example, with reference to the accompanying drawings in which:

FIG. 1 is a perspective view of a preferred embodiment of an air cushion vehicle skirt according to the present invention;

FIG. 2 is an enlarged transverse slice or section of the wall of the skirt of FIG. 1, taken along lines 2—2 of FIG. 1;

FIG. 3 is an enlarged portion of the wall of the skirt shown in FIG. 2 and indicated by the circled area 3, FIG. 3 being partly broken away for the purpose of illustration;

FIG. 4 is a vertical cross-sectional view of the preferred embodiment of the skirt taken along lines 4—4 of FIG. 1;

FIG. 5 is a vertical cross-sectional view similar to FIG. 4 but of another embodiment of an air cushion vehicle skirt according to the present invention;

FIG. 6 is a vertical cross-sectional view of yet another embodiment of an air cushion vehicle skirt according to the present invention; and FIG. 7 is still another vertical cross-sectional view of a preferred embodiment of an air cushion vehicle skirt according to the present invention.

Referring to the drawings, FIG. 1 shows a typical configuration for an air cushion vehicle skirt 10. Skirt 10 has an annular side wall 12 which is curvilinear, in that it curves or is rounded in both the horizontal and vertical planes. Side wall 12 includes an inwardly curved upper wall portion 14 and an inwardly curved lower wall portion 16, so that annular wall 12 is C-shaped in cross-section.

Upper wall portion 14 has an upper peripheral edge portion 18 which defines an air inlet 20 through which lift or support air enters skirt 10. Peripheral edge portion 18 defines a plurality of openings 22 molded therein for attaching skirt 10 to an air cushion vehicle platform (not shown). An air cushion vehicle platform or trunk defines the support air outlet of the vehicle for supplying lift or support air to the skirt. The formation of openings 22 will be described further below. Lower wall portion 16 includes a lower peripheral edge portion 24 which is adapted to be located above ground level by the pressure of the support air inside skirt 10 when the air cushion vehicle is in operation.

Referring in particular to FIGS. 2 to 4, the flexible sheet material from which skirt 10 is formed is shown to have a foraminous fabric substrate 26 which includes a plurality of filaments 28. In this disclosure, the term "fabric" is intended to include substrates that are woven, non-woven or scrim, knitted, or felted. However, foraminous fabric substrate 26 has openings or interstices 30 and any substrate material defining interstices 30 is still considered to form filaments for the purposes of this disclosure. Before substrate 26 is incorporated into side wall 12, the total area of interstices 30 is approximately 25 to 35 percent of the area of substrate 26. This open area, or percentage openness, is varied during the construction of side wall 12, as will be described further below.

The foraminous substrate 26 shown in FIG. 3 is a triaxially woven fabric material wherein the filaments are made of KEVLAR fibers. Kevlar is a trade mark of E. I. du Pont de Nemours & Company Incorporated of Wilmington, Delaware, United States of America. KEVLAR is a high strength, high modulus aramid fiber material, which is readily obtainable in yarn form. Before the KEVLAR yarn is woven into substrate 26, the yarn is preferably precoated with polyurethane to facilitate weaving and avoid "wicking" problems inherent in prior art skirt materials. The uncoated yarn or filaments 28 of substrate 26 are of a denier which varies according to the strength required of the skirt material, but typically, the weight of fabric substrate 26 varies between 2.5 ounces and 30 ounces per square yard. In the preferred embodiment, a triaxially woven substrate 26 is approximately 33 percent open before it is coated as described below.

Substrate 26 has an inside or first side surface 32, and an outside or second parallel side surface 34. A first coating of polyurethane 36 is located on the filaments on first side surface 32, and a second coating of polyurethane 38 is located on the filaments on second side surface 34. As will be described further below, the first and second coatings 36,38 extend into the foraminous substrate and are integrally bonded together, thereby defining the interstices 30 between the filaments in the coated substrate. It will be noted that only lower wall portion 16 has interstices 30. Upper wall portion 14 is coated with sufficient polyurethane to fill the openings in the foraminous substrate and form continuous, impermeable coatings 36, 38. As a result, upper wall portion 14 is impermeable and lower wall portion 16 is permeable, thus allowing air to pass therethrough. Side wall 12 is therefore semi-permeable, the purpose of which will also be described further below.

The method of constructing skirt 10 will now be described. In order to produce the air cushion vehicle skirt 10, a mold is first produced in the general desired shape or design of the skirt. The mold may be formed of any suitable material and is not considered to be part of the present invention. Therefore, the mold will not be described in further detail in the present disclosure. Having provided the mold in the form of a predetermined skirt shape, a release agent is applied to the mold. Suitable release agents are zinc stearate or other common fluorocarbon or silicone release agents. The mold is then ready for the production of skirt 10.

The semi-permeable skirt 10 shown in FIG. 1 is produced by masking a portion of the mold corresponding to the area of the lower permeable wall portion 16. The area of the mold corresponding to upper wall portion 14 is then sprayed with a liquid, uncured polyurethane to form first polyurethane layer or coating 36. First coating 36 typically varies in thickness from 0.002 inches up to 0.5 inches, again depending upon the strength required and size of the skirt being produced. An average thickness for first coating 36 is 0.020 inches. The polyurethane used for first and second coatings 36, 38 is a sprayable two-component (resin and catalyst or accelerator) ambient temperature polyether based urethane sold by Tip Top Rubber Products Limited of Toronto, Canada under the trade mark TIP TOP BR-3S. This polyurethane, when cured, has a hardness or durometer of between 82 and 86 Shore A scale. When the resin component and the catalyst component are mixed in a ratio of approximately 100 to 15 or 16 parts by weight, the elastomer mixture begins to cure. At 72° Fahrenheit, the elastomer will cure to a serviceable condition in about 48 hours and will be fully cured in about 7 days. Increased ambient temperatures substantially reduce the curing time, as is well known to those skilled in the art.

Having applied the first polyurethane coating 36 to the mold, the masking in the area of lower wall portion 16 is removed and the foraminous substrate 26 is applied over the entire mold. Substrate 26 is laid over the first polyurethane layer before it is cured so that some of the polyurethane strikes through the substrate and enters interstices 30. The substrate 26 is laid up in sections or pieces with the marginal edges of the substrate pieces overlapped approximately 2 inches. The substrate filaments 28 are separated in the area of openings 22 so that the filaments are not broken but surround openings 22. For this purpose, the mold may be provided with projections or pegs in the area of the upper peripheral edge portion 18 corresponding to openings 22. The filaments 28 would then be parted as the substrate is pushed onto the pegs to form openings 22. If it is necessary to join pieces of substrate in the area of lower wall portion 16, the overlapping peripheral edges of these pieces are thoroughly coated with liquid, uncured polyurethane, and this produces an integral bond between the substrate pieces rather than a seam, as described further below.

After the substrate has been applied to the mold, the substrate is coated with the second continuous polyurethane layer or coating 38, so that the polyurethane penetrates the substrate through interstices 30 and mixes with the polyurethane of first layer 36. This mixing of the polyurethane in first and second layers 36, 38 results in an integral bond or a chemical bond between the layers of polyurethane, and as such, the skirt material cannot be delaminated once the polyurethane has been cured. The second polyurethane coating 38 in the area corresponding with upper wall portion 14 is typically of the same thickness as the first polyurethane coating 36, an average thickness being about 0.020 inches. Once the polyurethane has been cured to a mild serviceable condition, skirt 10 is removed from the mold. The substrate 26 is then sprayed with liquid, uncured polyurethane in the area of lower wall portion 16. A first coating of polyurethane is applied to the filaments on the first side surface 32, and a second coating of polyurethane is applied to the filaments on the second side surface 34. These first and second coatings extend into the foraminous substrate to completely surround or envelope filaments 28 and thus define the interstices 30 in the coated substrate between the filaments. In other words, these first and second coatings are not sufficient to block or plug the interstices 30. However, the coatings are integrally bonded together because they completely surround the filaments and are cured together, and thus the skirt material is continuous and cannot be delaminated in the area of lower wall portion 16 as well.

After skirt 10 has been removed from the mold, additional or further layers of polyurethane may be sprayed onto skirt 10 to build up or reinforce the walls. These additional or further polyurethane layers may be applied before or after the initial polyurethane layers have been fully cured, and may form part of or be in addition to first and second coatings 36, 38. Further, subsequent coatings may be color coded or differently colored to act as wear indicators in the event that some layers are worn off through abrasion in use. If the additional layers are applied before the initial layers are fully cured, all of the layers will be cured together and thus integrally bonded. If the additional layers are applied after the initial layers are fully cured, the additional layers will also be bonded to the initial polyurethane layers, but these additional layers could delaminate under extreme conditions. In order to reduce the likelihood of such delamination, it is preferable to apply a suitable primer prior to the application of subsequent polyurethane layers over fully cured layers. In particular, where the skirt material is being sprayed or rebuilt, a primer is recommended.

As seen best in FIGS. 1 and 2, the permeable lower wall portion 16 extends in height up from lower peripheral edge portion 24 approximately ¼ to ½ of the height of side wall 12. The permeable lower wall portion 16 allows a portion of the support or lift air inside skirt 10 to pass therethrough to act as a lubricant to reduce drag as the skirt travels over the ground and contacts the ground surface. The air bleeding or passing through permeable lower wall portion 16 also helps prevent the air cushion vehicle from "tramping," which is a vertical oscillation caused by changes in the velocity of the air passing outwardly from under skirt 10. It will be appreciated that the amount of air passing through permeable lower wall portion 16 will depend upon the air pressure inside skirt 10 and the percentage of open area of the lower wall portion. If desired, this percentage of open area may be reduced simply by spraying more polyurethane onto lower wall portion 16 so that filaments 28 have a thicker coating of polyurethane. The open area of the permeable or foraminous substrate in the lower wall portion 16 typically varies between 5 and 50 percent of the total fabric area.

Referring next to FIGS. 5 to 7, additional embodiments of air cushion vehicle skirts will now be described. In the embodiment shown in FIG. 5, skirt 40 is shown wherein the full area of side wall 12 is coated with continuous layers of polyurethane. In other words, there is no permeable lower wall portion. Otherwise, skirt 40 is constructed in the same manner as skirt 10 shown in FIG. 1.

FIG. 6 shows a skirt 42 having a generally flat floor 44 continuously joined to a lower wall portion 46. In other words, floor 44 is an extension of the annular side wall 12 or may be considered to join lower wall portion 46 where the lower peripheral edge of wall portion 46 would otherwise be located. Floor 44 is a permeable member and is constructed in the same manner as lower wall portion 16 of the embodiment shown in FIGS. 1 to 4.

FIG. 7 shows yet another embodiment of a skirt 48, but having a fully permeable annular side wall 12, including a permeable floor 50. The entire annular wall 12 and floor 50 is constructed in a manner similar to the lower wall portion 16 shown in the embodiment of FIGS. 1 to 4, except for upper peripheral edge portion 18, which has a continuous polyurethane coating as in the embodiment of FIGS. 1 to 4. In skirt 48, the thickness of the polyurethane coatings decreases from a maximum adjacent to upper peripheral edge portion 24 down to a minimum at floor 50. Of course, the area of openness or degree of permeability decreases as the thickness of polyurethane coatings increases, since the interstices are filled in more as the coating thickness increases. The result is that more air comes out of the bottom or floor of skirt 48 than comes out of the side walls, this airflow decreasing up the wall.

Having described preferred embodiments of the invention, it will be appreciated that various modifications may be made to the structures and method described. It will be apparent that other foraminous substrates may be used in place of the triaxially woven KEVLAR fabric described. Firstly, other fiber materials may be used, such as polyester, nylon, or even steel filaments. Also a hybrid fabric formed of different fibers or filaments may be used if desired. Secondly, any conventional weave could be used for the fabric. The triaxially woven fabric described above is particularly advantageous because it provides generally isotropic strength characteristics. Another weave which has this characteristic is that which is conventionally employed in cane back furniture and known as cane back weave. The weave should have a percentage of open area of at least 5 percent, so that the polyurethane may strike through allowing the polyurethane layers to mix and cure together providing the integral bond desired. It will also be appreciated that more than one layer of substrate may be integrally molded to form a multi-ply skirt material. In particular, if a conventional biaxial weave substrate is used, it is desirable to include a second ply of biaxial substrate oriented on the bias laid over the second polyurethane coating, and an additional layer of polyurethane applied on the bias ply, in order to provide multiple bias ply layers of substrate for increased strength. Multiple plies of different fabric materials may also be used if desired. However, where multiple plies are used, it is more difficult to orientate the substrate layers to produce the permeable portion of the skirt wall if this is desired.

It will also be appreciated that there are many types of urethanes available which could be used in the present invention. In air cushion vehicle skirts, high abrasion resistance is of prime importance, but in some applications low temperature flexibility, or resistance to deterioration by oils, solvents or chemicals may be prime considerations. In these cases, the formulation of the polyurethane may be changed to obtain the desired properties. Further, different types of polyurethanes may be used on the same air cushion vehicle skirt if it is desirable to combine properties of some different urethanes. For example, some urethanes have a hardness of between 20 and 90 durometer Shore A scale and other urethanes have a hardness of between 70 and 100 durometer Shore D scale. As a result, the hardness of the polyurethane used in an air cushion vehicle skirt could vary between 20 durometer Shore A scale and 100 durometer Shore D scale.

It will be apparent that in making the air cushion vehicle skirts described above, either male or female type molds may be used. Also, it is possible to mold complex shapes by using a hand lay-up procedure and a fast curing polyurethane. In other words, it is possible to hold pieces of foraminous substrate in position, fully coat mating pieces of substrate with polyurethane, and apply heat to cure the polyurethane and integrally bond the pieces of substrate together, as described above.

Finally, it will be appreciated that the material described above will have many uses other than for air cushion vehicle skirts and the like. For example, the material may be used for pump diaphragms, roof structures, swimming pool liners and covers, etc. The sheet material may be formed on a flat surface, and for this reason, the term "curvilinear" in this disclosure is intended to include straight or flat surfaces, as well as curved surfaces.

From the above, it will be appreciated that this invention provides a very high strength, highly abrasion resistant, flexible sheet material and method of making same, which is particularly useful for air cushion vehicle skirts which are prone to tearing and delamination. Skirts made according to the present invention have no mechanical seams and may be molded into almost any configuration desired. This provides great flexibility in air cushion vehicle skirt design, with the result that improved skirt designs can now be produced using the present invention.

What I claim as my invention is:

1. A molded skirt for an air cushion vehicle or the like having a platform defining a support air outlet, the skirt comprising:

a continuous annular wall having an inwardly curved upper wall portion and inwardly curved lower wall portion, so that the annular wall is C-shaped in cross-section;

said upper wall portion having an upper peripheral edge portion defining an air inlet, the upper edge portion including means for attaching the skirt to a vehicle platform so that support air enters the air inlet;

the lower wall portion having a lower peripheral edge portion adapted to be located above ground level by support air pressure inside the skirt;

the annular wall including a foraminous fabric substrate formed of a plurality of filaments, the substrate having first and second parallel side surfaces; a first coating of polyurethane on the filaments on the first side surface; and a second coating of polyurethane on the filaments on the first surface; and a second coating of polyurethane on the filaments on the second side surface, the first and second coatings extending into the foraminous substrate and being integrally bonded together to envelope the filament and define interstices on the coated substrate between the filaments.

2. A skirt as claimed in claim 1 wherein the foraminous substrate extends over the full area of the annular wall.

3. A skirt as claimed in claim 2 wherein the foraminous substrate is formed of triaxially woven fabric having an open area between about 5 and about 50 percent of the total fabric area.

4. A skirt as claimed in claim 3 wherein said upper wall portion includes additional layers of polyurethane on said first and second side surfaces, said additional layers being integrally bonded to said first and second coatings, said additional layers filling said interstices to form a continuous non-permeable polyurethane coating on said upper wall portion.

5. A skirt as claimed in claim 3 wherein the polyurethane coatings are between about 0.002 inches and about 0.5 inches in thickness.

6. A skirt as claimed in claim 3 wherein the urethane is a sprayable polyetherbased urethane to provide a polyurethane having a hardness of between about 20 durometer Shore A scale and about 100 durometer Shore D scale when cured.

7. A skirt as claimed in claim 3 wherein the foraminous substrate is formed of fibers selected from the group consisting of an aramid, a polyester, and a nylon.

8. A skirt as claimed in claim 4 and further comprising further layers of polyurethane bonded to said additional layers, and wherein said additional and further polyurethane layers are color coded.

9. A skirt as claimed in claim 1 wherein the foraminous substrate is a biaxial open weave fabric, and further comprising: a second bias ply of open weave fabric laid over the second polyurethane coating, and an additional layer of polyurethane on said bias ply.

10. A skirt as claimed in claim 1 and further comprising further layers of polyurethane bonded to the polyurethane on said first and second side surfaces.

11. A skirt as claimed in claim 1 and further comprising a generally flat floor continuously joined to the lower wall portion at said lower peripheral edge portion, said floor being an extension of the annular wall.

12. A skirt as claimed in claim 1 wherein said means for attaching the skirt to a vehicle platform comprises means defining openings molded into the upper peripheral edge portion, the foraminous substrate filaments extending unbroken around said openings.

13. A skirt as claimed in claim 1 wherein the foraminous substrate is formed of fibers selected from the group consisting of an aramid, a polyester and a nylon.

14. A skirt as claimed in claim 1 wherein the foraminous substrate is formed of a high strength, high modulus aramid fiber and varies in weight between about 2.5 ounces per yard and about 30 ounces per yard.

15. A skirt as claimed in claim 14 wherein the foraminous substrate is formed of filaments precoated with polyurethane.

16. A skirt as claimed in claim 1 wherein the foraminous substrate is formed of filaments precoated with polyurethane.

* * * * *